US008201082B1

(12) United States Patent
Nordstrom et al.

(10) Patent No.: US 8,201,082 B1
(45) Date of Patent: Jun. 12, 2012

(54) DYNAMIC GENERATION OF DOCUMENTS

(75) Inventors: Paul Nordstrom, Seattle, WA (US); Eric Benson, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 848 days.

(21) Appl. No.: 12/259,263

(22) Filed: Oct. 27, 2008

Related U.S. Application Data

(62) Division of application No. 10/260,215, filed on Sep. 27, 2002, now abandoned.

(60) Provisional application No. 60/386,214, filed on Jun. 17, 2002.

(51) Int. Cl.
*G06F 17/00* (2006.01)

(52) U.S. Cl. ........................................ 715/234

(58) Field of Classification Search .................. 715/234; 719/312; 718/100, 102, 104
See application file for complete search history.

(56) References Cited

U.S. PATENT DOCUMENTS

| 5,715,453 A | 2/1998 | Stewart |
| 5,974,443 A | 10/1999 | Jeske |
| 6,012,098 A * | 1/2000 | Bayeh et al. ................. 709/246 |
| 6,415,335 B1 | 7/2002 | Lowery et al. |
| 6,430,624 B1 | 8/2002 | Jamtgaard et al. |
| 6,526,521 B1 | 2/2003 | Lim |
| 6,732,185 B1 * | 5/2004 | Reistad .......................... 709/238 |
| 6,779,002 B1 | 8/2004 | Mwaura |
| 2001/0005852 A1 | 6/2001 | Bogle et al. |
| 2002/0103856 A1 | 8/2002 | Hewett et al. |
| 2002/0147805 A1 | 10/2002 | Leshem et al. |
| 2003/0101213 A1 | 5/2003 | Wright |
| 2003/0204490 A1 | 10/2003 | Kasriel |
| 2004/0015476 A1 | 1/2004 | Twaddle |

FOREIGN PATENT DOCUMENTS

| WO | 9745799 | 12/1997 |
| WO | 0157721 A3 | 8/2001 |

OTHER PUBLICATIONS

John Mashey "Re: Shared Memory vs. Message Passing (Dead Horse Flogging)" http://homepages.cwi.nl/~robertl/mash/msg-passing.*
Antony Pinchbeck, "Thread Pooling: An Investigation", Overload Journal #41—Feb. 2001 + Programming Topics http://accu.org/index.php/journals/461.*
Vermeulen, A., "An Asynchronous Design Patter," Dr. Dobbs Journal, dated Jun. 1996.

* cited by examiner

*Primary Examiner* — Adam M Queler
(74) *Attorney, Agent, or Firm* — Knobbe, Martens, Olson & Bear LLP

(57) ABSTRACT

A system and methods for dynamically generating electronic documents, such as web pages or XML documents, provides increased program parallelism and reduced document generation times. In one embodiment, two separate threads are used: a first thread that processes a document template, and a second thread that handles requests for data. Also disclosed are methods for selectively combining particular data requests for transmission on a network.

25 Claims, 11 Drawing Sheets

DYNAMIC GENERATION OF DOCUMENTS

RELATED APPLICATIONS

This application is a division of U.S. application Ser. No. 10/260,215, filed Sep. 27, 2002, now abandoned which claims the benefit of U.S. provisional Appl. No. 60/386,214, filed on Jun. 17, 2002.

The aforesaid applications are hereby incorporated by reference.

BACKGROUND OF THE INVENTION

1. Field of the Invention

The present invention relates generally to the dynamic generation of electronic documents, and to the retrieval of data for incorporation into such documents.

2. Description of the Related Art

Prior systems for dynamically generating electronic documents, such as web pages, have suffered from performance problems. The dynamic generation of a web page is typically a computationally intensive task. As a result, the time taken by the system to generate the document increases with the size or complexity of the requested document. Although manual parallel programming techniques can be used to accelerate the dynamic generation of a web page, manually parallelizing page generation code requires skill, expertise and training. Manually parallelizing page generation code is therefore oftentimes not a practical option for increasing the performance of document generation systems.

DETAILED DESCRIPTION OF THE EMBODIMENTS

Figure 1:
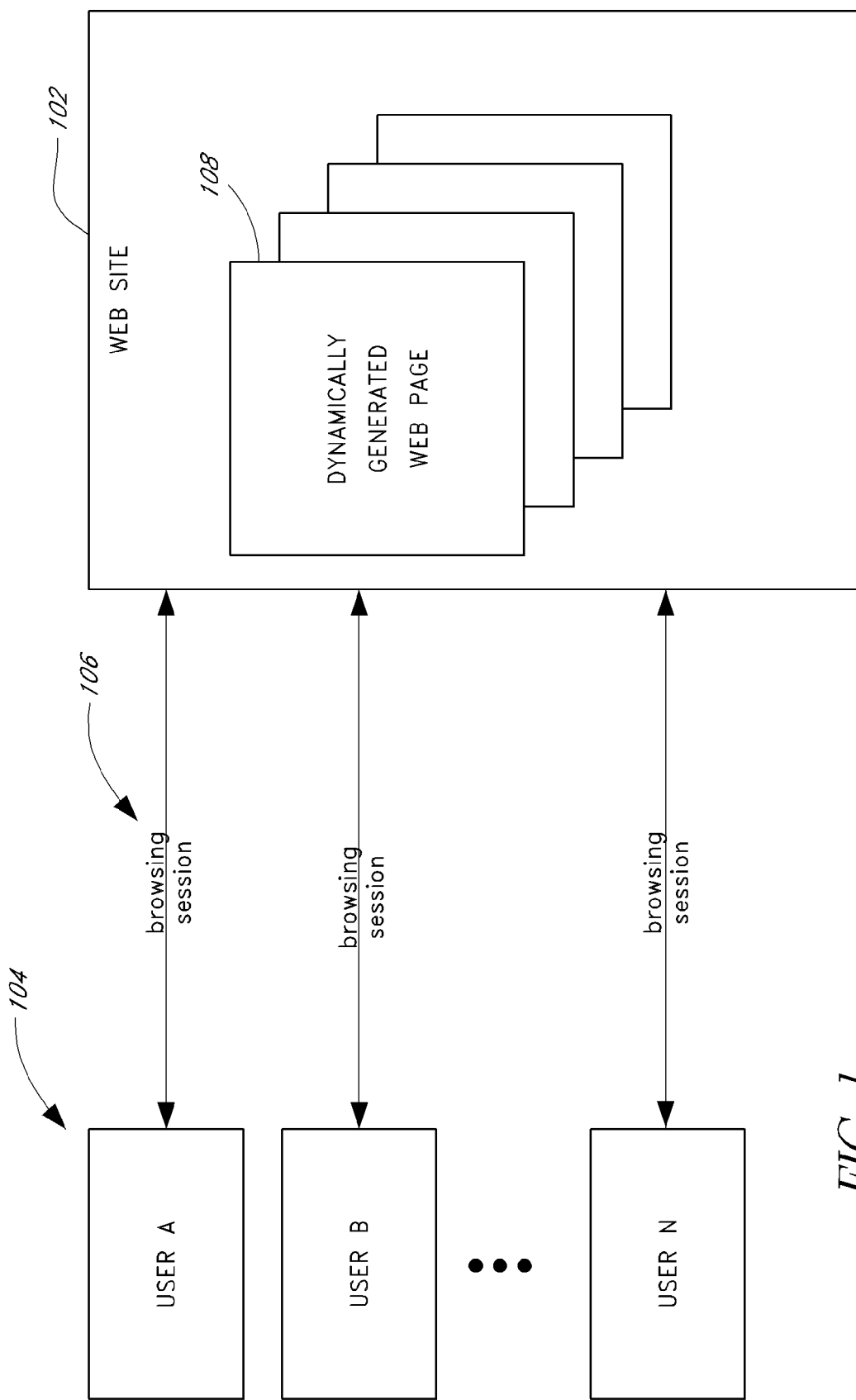
FIG. 1 illustrates a web site configured to serve dynamically generated web pages to multiple users.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices, components, and methods to those described herein. In other instances, well-known devices, components, and methods have not been described in detail so as not to unnecessarily obscure aspects of the present invention.

As used herein, the term "based upon" is intended to encompass situations in which a factor is taken into account directly and/or indirectly, and possibly in conjunction with other factors, in producing a result or effect.

I. Overview

A system and methods for dynamically generating electronic documents such as web pages, XML documents, SGML documents, postscript documents, or other documents, provide automatic detection and implementation of program parallelism to improve document generation response times. The system and methods combine the performance enhancements of parallel execution, the responsiveness of an event-driven application, and the simplicity of linear execution. In a preferred embodiment, the system and methods are configured to dynamically generate web pages in the context of a web site hosting system. The systems and methods are particularly advantageous in high-traffic environments requiring the timely generation of millions of electronic documents.

A document rendering process (or page rendering process) generates one or more requests for data, which are in turn handled by various remote services. The services eventually return with the data requested by the document rendering process and the data is incorporated into the dynamically generated document.

The document rendering process preferably operates with two threads of control: (a) a linearly executing thread (linear thread) and (b) an event-driven thread. The linear thread preferably interprets a document template (or page template) using a sequential control flow to create the document. Requests for data are preferably handled by the event-driven thread so that multiple requests for data can be processed in parallel.

The linear thread is preferably configured to initiate, in the beginning portion of its code, one or more calls or messages to the event-driven thread for data that will be subsequently needed. The calls or messages can be implemented in the form of events that are handled by the event-driven thread. In response to an event from the linear thread, the event-driven thread preferably generates and transmits a request for data (service request) and then waits for another event. The generation of an event by the linear thread is preferably non-blocking, and therefore multiple calls for data can be issued sequentially by the linear thread. The event-driven thread can issue multiple requests for data in response to the events and the multiple outstanding requests can be processed simultaneously in parallel by the services from which the data has been requested.

The linear thread and the event-driven thread preferably communicate through a special-purpose communication channel based on shared memory, triggers, and semaphores. (The pthread_mutex_lock and pthread_mutex_unlock functions are preferably used to lock and unlock the mutex and such function calls shall hereinafter be referred to simply as "locking" or "unlocking" One skilled in the art will appreciate, of course, that other techniques exist to lock and unlock as well). When the linear thread needs to send a message or data to the event-driven thread, the linear thread writes data to a shared memory location and triggers an event to which the event-driven thread responds. When the linear thread needs to receive a message or data from the event-driven thread, the linear thread locks and blocks until the event-driven thread is unlocked.

As each service responds to a request for data, it triggers another event to which the event-handling thread responds. The event handling thread preferably receives the data generated by the service and writes the data to an appropriate location for access by the linear thread. The linear thread is preferably configured to block, preferably using pthread_mutex_lock, in the case it tries to read data that has not yet been provided by the event-driven thread. Once data becomes available, the event-driven thread unblocks the linear thread preferably using pthread_mutex_unlock.

In accordance with one embodiment, the event-driven thread and the services communicate using a publish-subscribe (pub/sub) communication protocol. The pub/sub protocol enables detachment of the event-driven thread from the services so that the event-driven thread need not know whether a particular service is local or remote to the executing processor. In addition, the implementation of a service can be changed or modified without requiring a corresponding change in the event-driven thread. Additional instances of a remote service can be added for scaling purposes without disrupting the operation of the event-driven thread.

In accordance with one embodiment, a template pre-processing step or procedure is used to reorder code to increase parallelism of document templates that are not specifically coded to take specific advantage of parallelism. Preferably, requests for data, which are nonblocking, are percolated up to the beginning of a document template so that multiple requests for data can be issued early and processed in parallel.

In accordance with one embodiment, service requests that depend on the results of other service requests use an in-process publish-subscribe based callback mechanism to reduce or prevent blocking of the event thread.

Where some or all of the service requests are transferred over a LAN or other communications network, an increased load may be placed upon the communication network by the service requests as the numbers of document rendering processes and/or processors increase. In one embodiment, in order to reduce the amount of traffic on the network, multiple service requests are combined into a single pub/sub message. The combined service request is then transmitted as a single request to the services that are configured to provide the requested data. Each of the providing services, in response, can transmit the requested data back to the requesting document rendering process using either pub/sub communication or point-to-point communication. By combining multiple service requests into a message, load on the network is accordingly reduced as well as the processing requirements of the client.

In the preferred embodiment, the linear thread sends requests for data to the event-driven thread and the event-driven thread then requests the data from the services. In an alternative embodiment, nonblocking requests for data are transmitted directly by the linear thread to the services. The event-driven thread then handles the receipt of the requested data from the services and makes the data available to the linear thread.

II. Dynamic Page Generation

FIG. 1 illustrates a web site 102 that is accessed by multiple users 104. Each of the multiple users 104 browses the web site 102 during a separate browsing session 106. The web site 102 preferably includes web pages 108, some or all of which are dynamically generated. Dynamically generated web pages are created on-the-fly, upon a user's request for the page, as opposed to static web pages, which are typically created in advance, stored, and then served upon request. Accordingly, dynamically generated web pages can be customized in response to particular users and to particular web page requests. Furthermore, multiple requests for the same page by the same or different users may not yield the same dynamically generated page. Dynamically generated web pages therefore enable a much higher degree of personalization and customization than static web pages.

III. Web Site Hosting System

Figure 2:
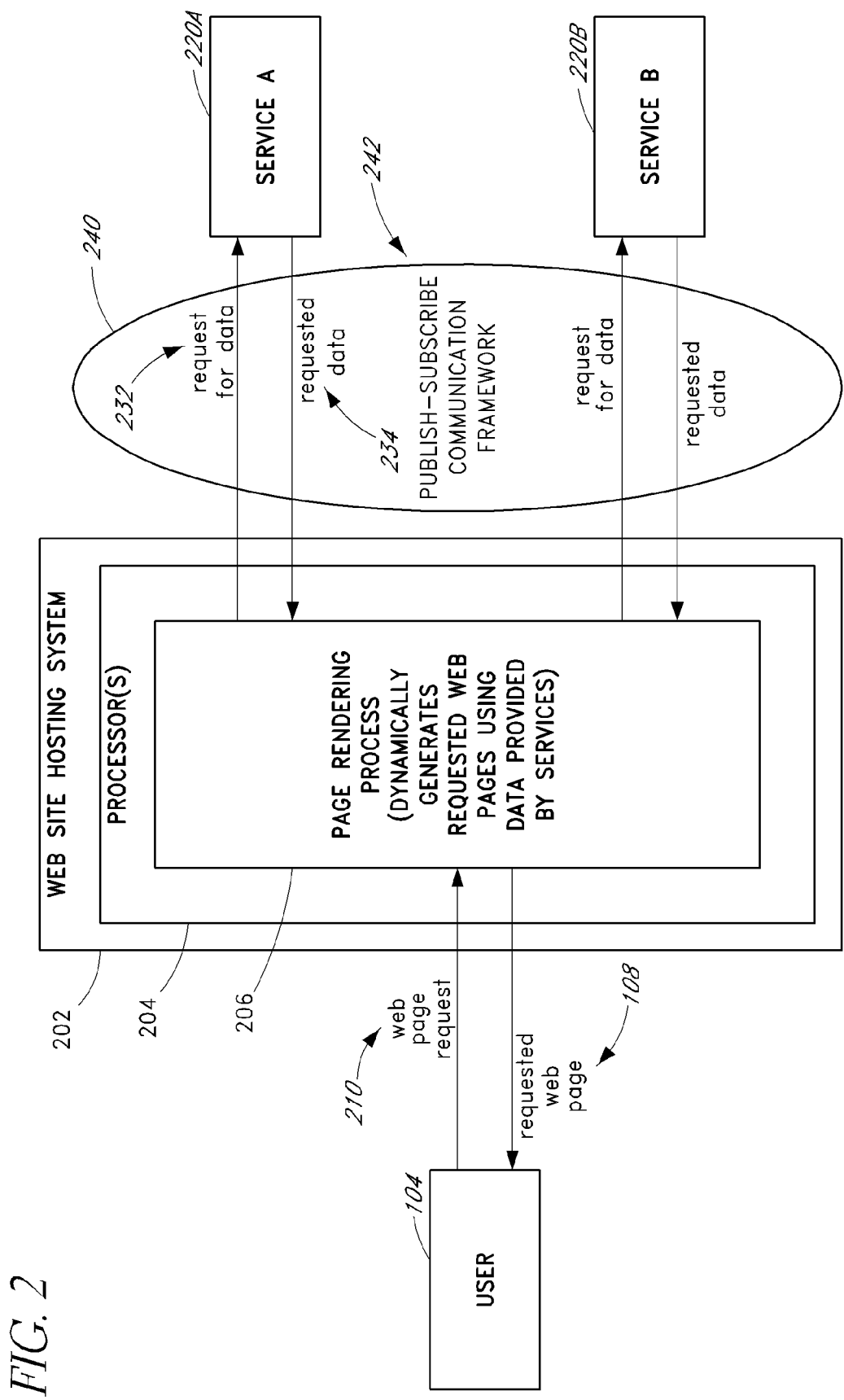
FIG. 2 illustrates a web site hosting system configured to dynamically generate web pages in accordance with one embodiment.

FIG. 2 illustrates a web site hosting system 202 configured to serve dynamically generated web pages in accordance with one embodiment. The system preferably includes one or more processors 204 configured to support the web site 102. Each processor 204 can be a microprocessor, computer, server, computing system or other computing device. A page rendering process (or document rendering process) 206 executing on the system is configured to dynamically generate web pages 108 in response to web page requests 210 received from users.

In one embodiment, the page rendering process 206 is preferably configured to obtain data from one or more services 220A-B. Data obtained from the services is used to compile a dynamically generated web page. Each of the services 220 can be a system (e.g. a server computer), process, resource (e.g. a database), or any "black box" configured to provide data requested by the page rendering process. The services 220 can be configured to handle details of generating portions of web pages so as to abstract a substantial amount of the detail of creating a web page away from the page rendering process. Multiple services 220 can be configured to handle multiple computationally intensive data generation tasks in parallel.

In one embodiment, a service 220 can be configured to create a component or widget (a portion of a web page), which merely needs to be concatenated with other components or widgets and possibly some additional HTML to form the complete web page. Alternatively, a service can be configured to provide formatted or raw data to the page rendering process based upon which the page rendering process creates a portion of the web page.

Preferably, the page rendering process 206 transmits a request for data (a service request 232) to a service 220. The service request 232 preferably includes a description of or information about the data being requested. For example, a service request may include a list of items that have been purchased or viewed by a user, and the service may use this list to generate and return a personalized list of recommended items. In response to receipt of the service request 232, the service 220 creates or obtains the requested data 234 and transmits the requested data to the page rendering process 206. The services 220 are preferably, but not necessarily, provided by computers or systems that are separate from the processor(s) 204 requesting the data. The processor 204 requesting the data can be connected to the service 220 providing the data by a communication network 240. Alternatively or additionally, services 220 can be integrated into the same computer or system as the page rendering process 206.

In one embodiment, the service request 232 is transmitted using a publish-subscribe (pub/sub) communication framework 242. In a pub/sub communication framework, various subjects of communication are defined. Programs can subscribe to a certain subject in order to receive communications related to that subject. Programs can also publish messages to a subject in order to send messages to any other programs that subscribe to the subject.

The requested data 234 can also be transmitted by the service 220 to the requesting process 206 through the pub/sub communication framework 242. In the preferred embodiment, the pub/sub communication framework 242 supports the communication of a "reply" message that is returned by the framework automatically to the sender of a previously published message. This reply feature can be used by services to provide data in response to a published request. In the case the requested data might be of use to more than one page rendering process 206 or processor 204, the service can provide the data through another published message. Alternatively, the requested data 234 can be transmitted by the service 220 to the requesting process 206 out-of-band from the pub/sub framework using point-to-point or other communication techniques.

Traditionally, when using point-to-point communication, a program that requests data has to identify the particular service, system, or program from which to make the request. By requesting and receiving data through a pub/sub communication framework 242, however, a request for data is decoupled from a particular service that provides data in response to the request. Indeed, the program requesting the data need not know what or which service will provide the data. The requesting program merely publishes a request for the desired data to a subject for making the request (e.g. data request subject) and subscribes to a subject to which the requested data will be published (e.g. requested data subject). The service that provides data subscribes to the subject for making the request and publishes the requested data to the subject to which the requested data is to be published. Accordingly, a service that provides data can be replaced with another service, or supplemented with additional services, in a manner that is completely transparent to the requesting program. Additional information on a commercially available pub/sub communication system can be obtained from Talarian Corporation (www.talarian.com). As will be understood by one skilled in the art, multicast or broadcast communication techniques could be used as alternatives to pub/sub.

IV. Web Page Templates

Figure 3:
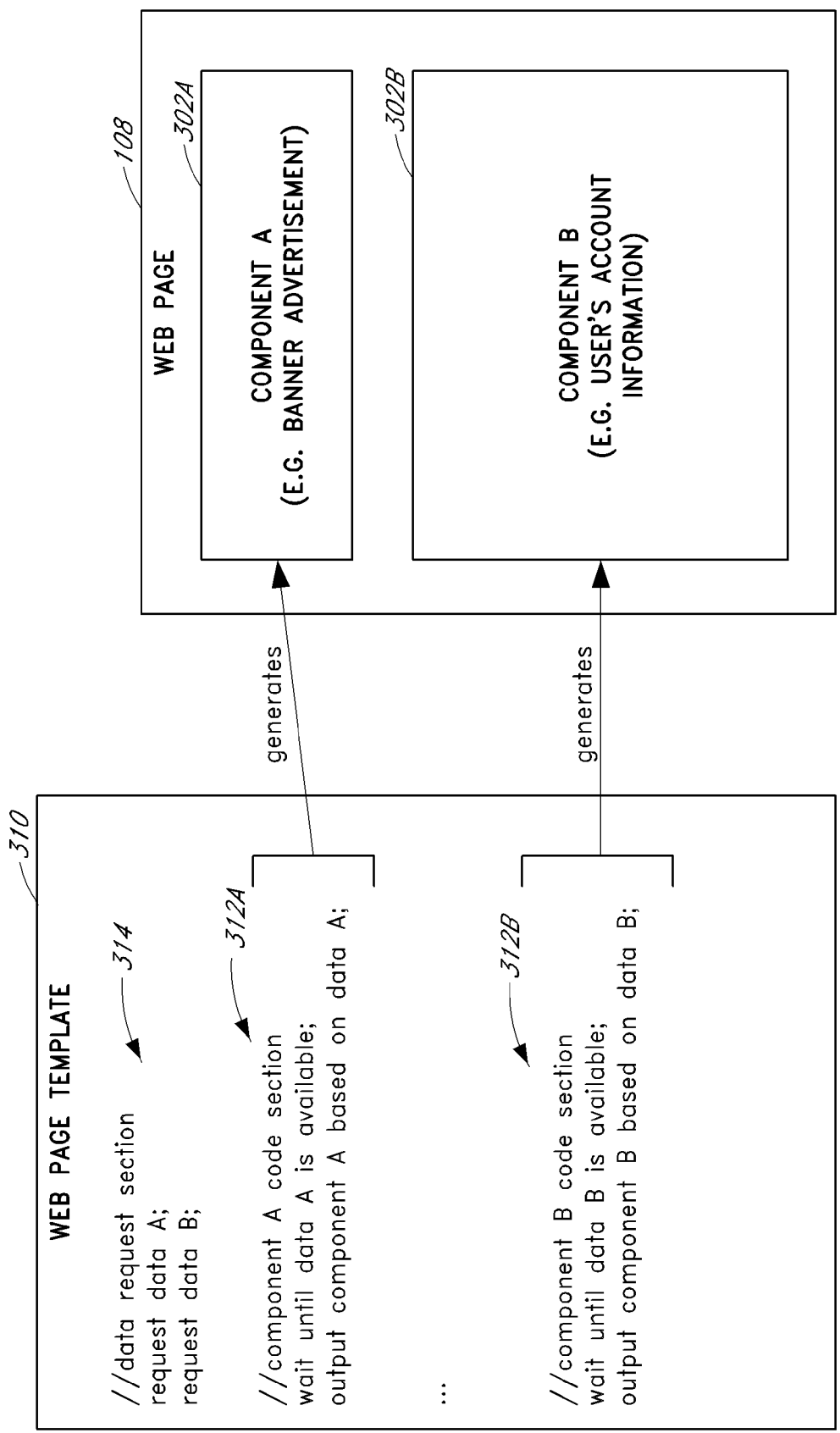
FIG. 3 illustrates schematic diagrams of an example web page and a corresponding template that can be interpreted or executed to create the web page.

FIG. 3 illustrates schematic diagrams of an example web page 108 and a corresponding template 310 that can be interpreted or executed to create the web page 108. In accordance with one embodiment, the page rendering process 206 interprets the template 310 to create the web page 108. Alternatively, the template 310 can be configured to be executed as the page rendering process 206 or a portion thereof. In one embodiment, the Perl Mason scripting language is used to code web page templates.

The template 310 preferably includes one or more code sections 312A-B that operate to generate the web page 108. The template 310 preferably also includes one or more data request sections 314 in which data is preferably requested from services 220 in advance of the point at which the data is actually needed in the template 310. As will be discussed below, the requests for data are non-blocking requests that allow the processing of the template 310 to continue until the data is actually needed. By requesting data in advance of the point at which it is needed, multiple requests can be made and serviced in parallel by multiple services 220.

In the illustrated example, the web page 108 includes two portions or components 302A-B. Each of the components 302A-B of the web page are created or included by corresponding code sections 312A-B. The code section 312A, for example, can be configured to include a banner advertisement in the web page 108 as the first component 302A. The banner advertisement or portions thereof can be been requested earlier in the template 310 from a service through the "request data A" statement in the data request section 314. The code section 312B, for example, can be configured to include a web page component that displays information about a user's account. The account information can be requested earlier in the template 310 from a service through the "request data B" statement in the data request section 314.

Referring again to FIG. 2, two services 220A-B are illustrated. The service 220A can be configured to provide data in response to the request for data A. The service 220B can be configured to provide data in response to the request for data B. Each service 220 can supply data that the page rendering process 206 uses to create a portion of the page. Alternatively, a service can be configured to supply complete sections or components that can be directly incorporated by the page rendering process into the generated page. By decoupling the page rendering process from services that supply data used by the page rendering process, a service can be reconfigured or replaced without having to reconfigure the page rendering process that uses the service.

As will be understood by one skilled in the art, the template 310 can be alternatively embodied as compiled machine native code, partially compiled intermediate code, as dynamically loaded classes or in other forms.

V. Threading Architecture

Figure 4:
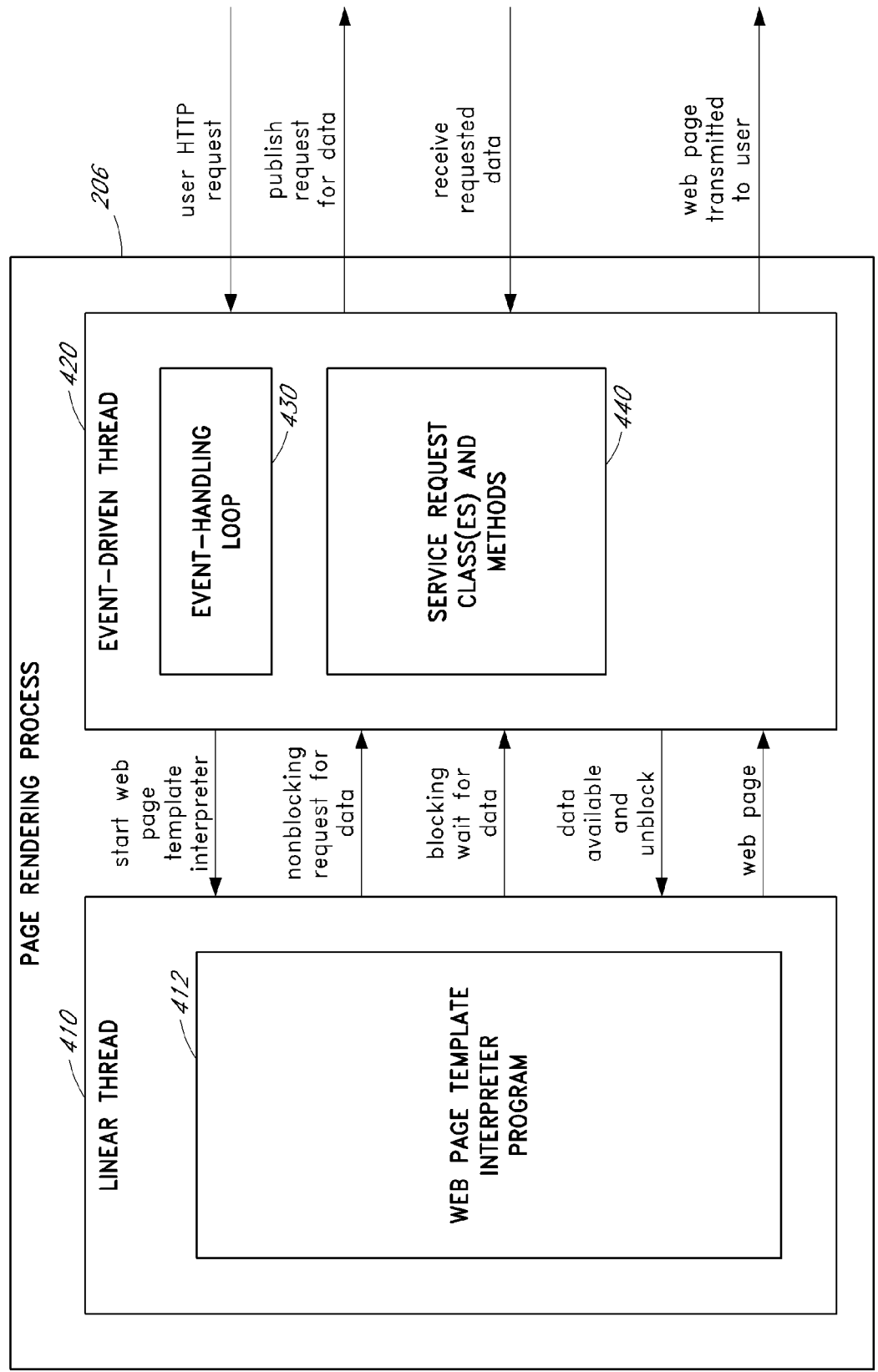
FIG. 4 illustrates a threading architecture of a page rendering process that enables and facilitates parallel execution in accordance with one embodiment.

FIG. 4 illustrates a threading architecture for the page rendering process 206 that enables and facilitates parallel execution in accordance with one embodiment. The page rendering process preferably includes a linear thread 410 and an event-driven thread 420. The two threads are preferably linked by certain messages and events as illustrated schematically in FIG. 4, for example. The linear thread 410 preferably executes a web page template interpreter program 412 configured to process a web page template 310 in a linear fashion. The event-driven thread 420 is preferably configured to handle events related to service requests 232 and to receive requested data 234 provided in response to the service requests.

The event-driven thread 420 preferably includes an event-handling loop 430, which detects events and initiates procedures to handle the events. Events can include, for example, detection of the receipt of a user HTTP request for a web page, receipt of a message from the linear thread 410 requesting data, or a receipt of data requested from a service.

The event-driven thread preferably also includes a set of service request classes 440. The service request classes 440 preferably include methods that formulate and transmit service requests 232, process requested data to make it available to the linear thread 410, and unblock the linear thread when data is available. Each service request class is preferably a dynamically loaded class that is instantiated within the context of the event-driven thread to handle the request and receipt of the data.

The linear thread 410 and the event driven thread 420 are preferably persistent, meaning that they handle one web page request after another without terminating. By reusing the same instance of the page rendering process 206 for multiple web pages, the additional overhead of starting a new process for each page request is avoided.

As will be appreciated by one skilled in the art, the linear thread 410 and the event-driven thread 420 can be different threads of control executing within a context of a single process. Alternatively, the linear thread 410 and the event-driven thread 420 can be completely separate processes with their own separate execution contexts, possibly operating on different processors 204. In certain embodiments, multiple linear threads 410 can share and operate in conjunction with a single event-driven thread 420.

VI. Page Generation Method

Figure 5:
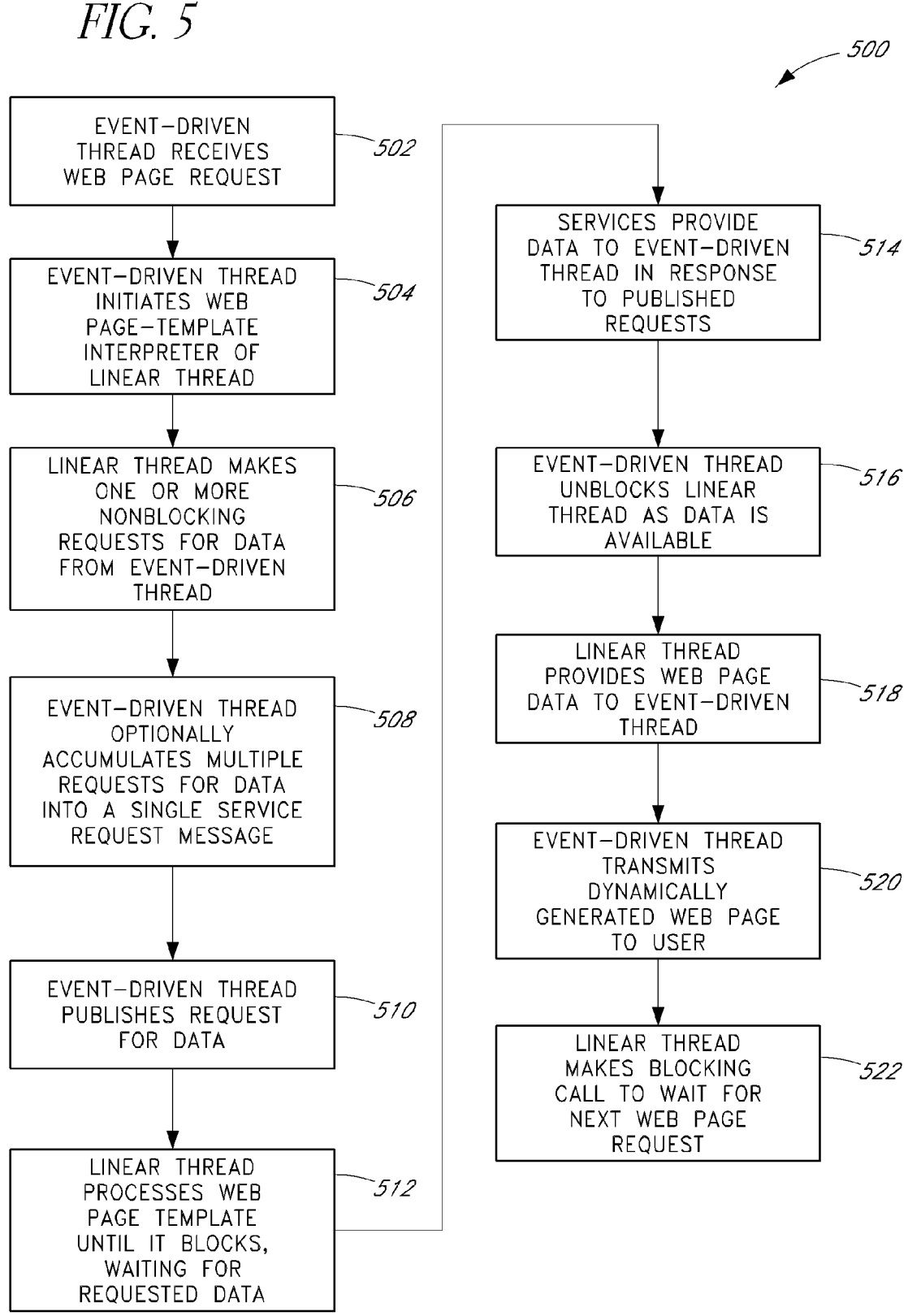
FIG. 5 illustrates a method through which a linear thread and an event-driven thread cooperate to generate a web page in accordance with one embodiment.

FIG. 5 illustrates a method 500 through which the linear thread 410 and event-driven thread 420 cooperate to generate a web page in accordance with one embodiment.

At a step 502, the event-driven thread 420 receives a web page request from a user. The receipt of the request is preferably recognized as an event by the event-driven thread 420.

At a step 504, the event-driven thread initiates the web page template interpreter 412 of the linear thread 410. Prior to the step 504, the linear thread 410 is preferably blocked, waiting for a page request. In one embodiment, a function such as pthread_mutex_lock can be used to block the linear thread until the event-driven thread calls pthread_mutex_unlock. The web page template interpreter then preferably loads and begins to interpret a web page template 310 associated with the requested page 108.

At a step 506, the linear thread 410 makes one or more nonblocking requests for data from the event-driven thread 420, preferably by sending messages to the event-driven thread 420. In one embodiment, the linear thread sends the requests for data to the event-driven thread by writing the requests for data to a known shared memory location and then initiating an operating system "trigger" event. The event-driven thread then responds to the trigger by reading the data in the known shared memory location.

The requests for data by the linear thread are preferably initiated by data request code in a data request section 314 of the web page template 412. The data request code is preferably included near the beginning of the web page template so that multiple requests can be processed in parallel by the event-driven thread while the linear thread continues to execute.

At a step 508, the event-driven thread 420 optionally accumulates multiple requests for data from the linear thread 410 into a single service request message. By accumulating multiple requests into a single message, the overhead of sending multiple messages through the communication network 240 is reduced. The preservation of bandwidth in the communication network is particularly important in an environment where millions of pages are published on a frequent basis. Preferably, only a portion of all types of service requests, such as those that are most frequently used in combination, are combined in a single request. The optional accumulation of multiple requests is discussed in additional detail in Section VIII.A, below.

Referring again to FIG. 5, at a step 510, the event-driven thread 420 publishes a request for data. In the case the request is not a combination of multiple requests, the subject of the request in the pub/sub communication framework 242 can include an identification of the type of service request.

In cases where multiple requests are combined into a single message, the combined message is preferably given a special subject that is subscribed to by all the services that provide data for any of the combined requests. In one embodiment, the combinations of requests that can be combined into a single message and the special subject of the message are determined upon configuring or programming the system rather than at runtime. In addition, the services that provide the requested data preferably subscribe to the special subject upon configuring or programming the system.

In one embodiment, a single subject titled "global request subject," for example, is assigned to any message containing a combination of service requests for data. In addition, any service that provides any of the types of data for which requests can be combined in the "global request subject" subscribes to that subject. In certain cases, a service will receive a request with the "global request subject" to which the service is configured to respond, so the service responds to the request. In other cases, a service will receive a request with the "global request subject" to which the service is not configured to respond, so the service discards the request. In one embodiment, multiple "global" subjects representing each of the various possible combinations of service requests are used and the associated services are configured to respond to combinations that contain applicable requests.

At a step 512, the linear thread 410 processes the web page template until it blocks, waiting for requested data. In one embodiment, the linear thread calls pthread_mutex_lock, which causes the linear thread to block. Once the event-driven thread 420 receives the requested data, the linear thread is unblocked by the event-driven thread through a pthread_mutex_unlock call as discussed in a step 516, below. Preferably, the linear thread will have requested most or all of the data required before it uses any of the requested data. In this manner, the multiple requests for data can be serviced in parallel.

At a step 514, the services 220 provide the requested data 234 to the event-driven thread 420. In one embodiment, the data is provided by services 220 through the pub/sub communication framework 242 using a "reply" message that is returned by the framework automatically to the sender of a previously published message. As the requested data is provided by the responding services, the event-handling loop 430 detects the arrival of the requested data and initiates a method of the corresponding service request class 440. The service request class method makes the data available to the linear thread 410 and possibly to other service objects in the event thread as well.

In an alternative embodiment, when the event-driven thread 410 publishes a service request, the event-driven thread can include a communication address to which the responding service can directly transmit the requested data. In this case, the data is provided outside the publish-subscribe communication framework 242, preferably using point-to-point communication.

At the step 516, the event-driven thread 420 unblocks the linear thread if the linear thread is currently blocked and waiting for data that has been made available. In one embodiment, the linear thread calls pthread_mutex_lock just before attempting to access each set of requested data. Each time the event-driven thread 420 receives a set of requested data, the event-driven thread calls pthread_mutex_unlock, which indicates that the requested data is available and that the linear thread can proceed. In the case where the linear thread locks before the event-driven thread unlocks, the linear thread will block until the event-driven thread calls pthread_mutex_unlock. In the case where the linear thread calls pthread_mutex_lock after the event-driven thread calls pthread_mutex_unlock, the pthread_mutex_lock operation will return immediately and the linear thread will not block. The step 516 is preferably repeated for each set of requested data.

At a step 518, the linear thread 410 provides web page data or web page source code to the event-driven thread 420. The linear thread 410 continues to execute the web-page template 310 to generate the requested web page until the linear thread completes interpreting the template.

At a step 520, the event-driven thread 420 transmits the dynamically generated web page to the user. The event-driven thread then waits for another request. In an alternative embodiment, the linear thread 410 sends the web page.

At a step 522, the linear thread 410 makes a blocking call to wait for the next web page request and the process returns to the step 502. In one embodiment, as discussed above with reference to the step 504, the linear thread calls an operation such as pthread_mutex_lock. The lock operation causes the linear thread to block until the event-driven thread calls pthread_mutex_unlock upon receiving another web page request.

The method 500 facilitates parallel execution with minimal effort on the part of the programmer. Programmers typically follow a standard practice of declaring variables in the beginning of a code section or function. An object creation routine that is executed in a variable declaration section of a web page template 310 can be configured to cause the linear thread to generate an event resulting in a request for data 232. Some or all of the data that is to be provided by services can be requested in this manner in a declaration section in the beginning of the template 310. This approach leverages the standard practice of declaring variables in advance in order to initiate parallel processes that will make subsequently needed data available for use by subsequently executed code in the template 310. In this manner, the declaration section can act as a data request section 314 of the template 310.

Each of the services 220 configured to return the requested data is preferably a separate system that can process requests independently of any other service. Accordingly, little or no additional effort on the part of the programmer is necessary in order to leverage parallel execution among multiple services and the page rendering process. By enabling this parallel execution, a substantial speedup in dynamically generating web pages can be achieved.

In one embodiment, the computer science "futures" programming construct is used in association with the request for and use of data. Accordingly, the processing of data is requested in advance of a time of its anticipated use is needed. Additional information pertaining to the futures construct is disclosed in an article by Allan Vermeulen entitled "An Asynchronous Design Pattern," Dr. Dobbs Journal, June, 1996.

VII. Handling of Requests for Data

Figure 6:
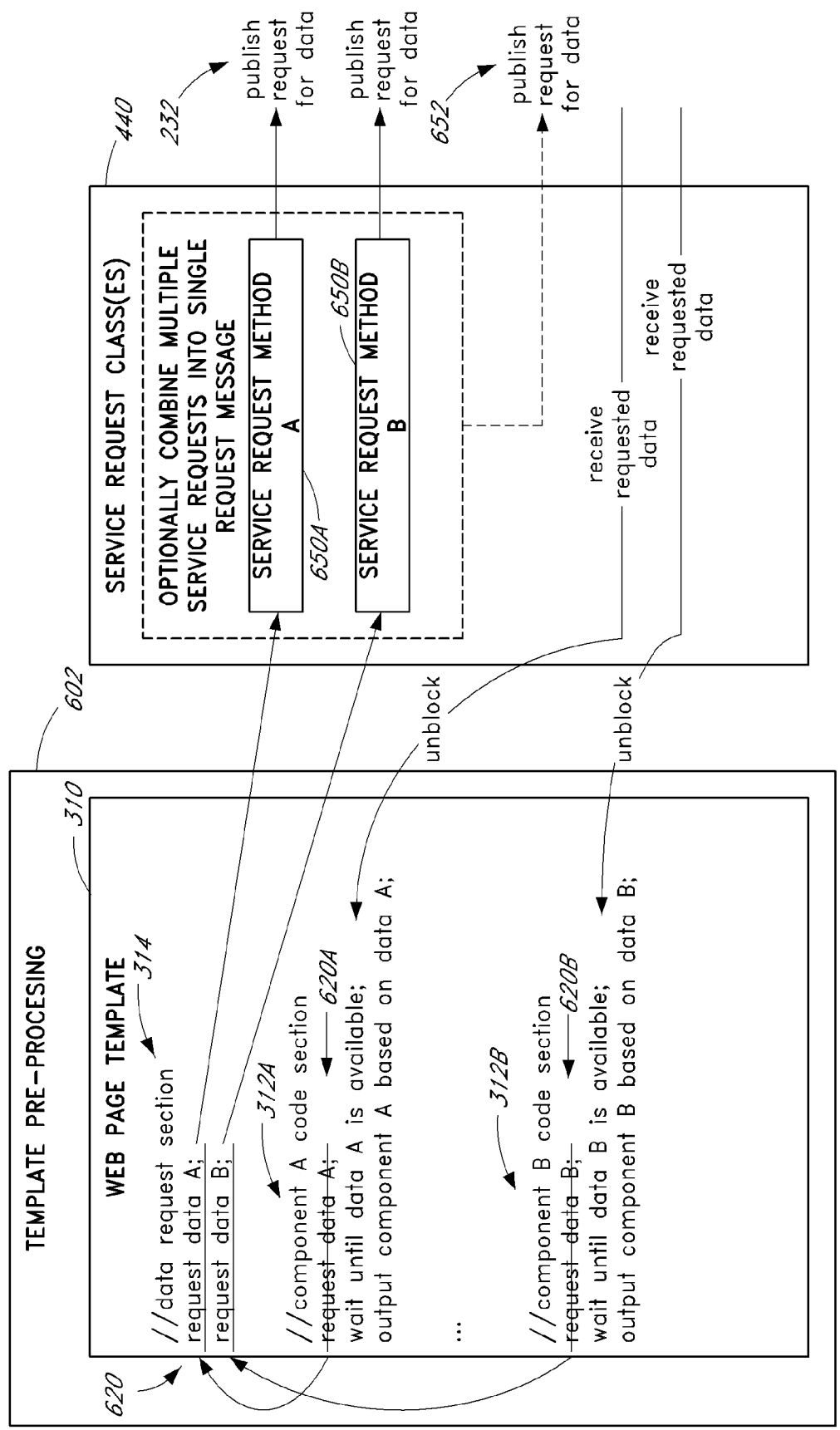
FIG. 6 illustrates in additional detail how a service request class of an event driven thread handles service requests for data and handles the receipt of the requested data.

FIG. 6 illustrates in additional detail how a service request class 440 of an event driven thread 420 handles service requests for data 232 and handles the receipt of the requested data 234. Preferably, a request for data in a data request section 314 is a nonblocking call, which sends an internal message to the event-driven thread. The event-driven thread 420 preferably handles the message through a service request method 650 of a service request class 440. The service request method 650, in turn, generates and publishes (or otherwise transmits) a request for data (service request) 232. In the meantime, the linear thread 410 reaches a point in the web page template 310 where requested data is needed, such as the line "wait until data A is available," at which point it then blocks if the data is not yet available. Once a service 220 responds with requested data, the service request class 440 of the event-driven thread makes the data available to the linear thread and unblocks the linear thread. The service request class 440 makes the data available to the linear thread by writing it to a shared location, and the service request class 440 can unblock the linear thread by calling pthread_mutex_unlock.

VIII. Performance Improvement Techniques

A. Combining Multiple Requests for Data

Referring again to FIG. 6, in one embodiment, multiple requests for data are optionally combined into a single request. Preferably, each request for data from the linear thread 410 is handled by a corresponding service request method 650 in the event-driven thread 420. In the case that requests are not combined, each service request method 650 transmits or publishes a separate request for data. When multiple requests are combined, one of the service request methods 650 can queue the request so that it is combined with another request. When two or more requests are accumulated by the event-driven thread 420, they can be published together using a single message 652. It will be appreciated by one skilled in the art that multiple requests from different service request methods 650 can be combined, or multiple requests from the same service request method (e.g., service request method 650A) can be combined. The challenge, of course, is recognizing that independent requests have commonality for purposes of such combination.

Determinations of which requests to combine and when to transmit requests can be based upon empirical timing data. In one embodiment, the system 202 collects timing information about how long each type of service request takes to be serviced. Based upon the collected timing information, determinations are made regarding when the event-driven thread should issue service requests. Suppose, for example, that there are five data requests in a template and requests one through four take a relatively long time to process, but the fifth can be processed quickly. The data requests one through four can be requested early, while the fifth can be requested at a later time. Accordingly, the event-driven thread can combine requests one through four in a single request 652.

Determinations of which service requests to combine and when to transmit requests can additionally or alternatively be based upon subjective complexity data. Each type of data request can be assigned a complexity factor representative of the likely time that it will take for the data to be provided by a service. The complexity factor can be assigned manually by a programmer or administrator that is familiar with the service.

In one embodiment, the event-driven thread 420 uses a trigger or timer to delay the transmission of a service request. If a service request that is received from the linear thread 410 is to be delayed, the event-driven thread can set a timer and then return to the event handling loop 430. Once the timer expires, an event is triggered and the event-driven thread sends the (possibly combined) service request.

In accordance with one embodiment, multiple requests from the linear thread 410 are queued until the linear thread blocks, waiting to access some of the requested data. Once the linear thread blocks, the queued requests for data are published so that the services can provide the data. Since the linear thread executes quite quickly until it blocks, the added delay in queuing requests is minimal compared to the time needed to service the requests. As a result, multiple requests can be easily combined.

Combining requests has the further advantage of optimizing bandwidth usage of the communications network 240. Combining requests has the obvious benefit of reducing the traffic on the network in terms of the number of messages carried on the network. Moreover, combining messages also reduces the amount of network bandwidth used because common data contained in each individual service request does not have to be repeated each time in the combined request. For example, three service requests, each of which contain a common 1 Kbyte block of data (totaling 3 Kbytes individually) may be combined into a single service request with a single 1 Kbyte of data and a small amount of additional overhead bytes to ensure that the common data is associated with each service request.

B. Template Pre-Processing and Autoparallelization

In one embodiment, a template pre-processing step or procedure 602 is used to reorder code to increase parallelism of web page templates that are not specifically coded to take advantage of parallelism. Ideally, programmers who create web page templates should place requests for data at the earliest possible point in a web page template. Training programmers to do this and enforcing this policy can, however, be difficult. In a preferred embodiment, the pre-processing procedure 602 is automated so that minimal (if any) input from the user is required.

FIG. 6 shows a web page template 310 including two web page component code sections 312A-B as it might be authored by typical programmer. As authored, the data-requesting code 620A (shown in strikethrough text) is included in the code section 312A in which it is used. The data-requesting code 620B (shown in strikethrough text) is included in the code section 312B in which it is used. As the template stands before pre-processing, the line of code "wait until data A is available;" must complete before the data-requesting code "request data A;" 620B is interpreted. Since the code "wait until data A is available" is a blocking call, the second line of data-requesting code 620B is not reached until the data A becomes available (shown by the "receive requested data" and "unblock" path). Consequently, the data A and the data B are only requested and generated sequentially, rather than in parallel.

FIG. 6 also shows (using underlining, strikethroughs and arrows) how the preprocessing procedure 602 can advance two items of data-requesting code 620A-B within a web page template 310. Preferably, the procedure 602 is configured to pre-process each template before it is executed for the first time in order to identify data-requesting code 620A-B that can be advanced in position within the template. The procedure 602 can be configured to move the data-requesting code to the earliest possible stage in the template code. Each data-requesting code section 620 can be advanced in position within a template as long as any data dependencies are maintained. Accordingly, if an item of data-requesting code does not depend upon any previous data-requesting code within the unprocessed template, the item of data-requesting code can likely be moved up to a data request section 314 in the beginning of the template. By including multiple items of nonblocking data-requesting code in this section, multiple data requests can be serviced in parallel. In the case that an item of data-requesting code depends upon data requested previously in the web page template, the item of code can be advanced within the template until just after the code upon which it depends.

Figure 7:
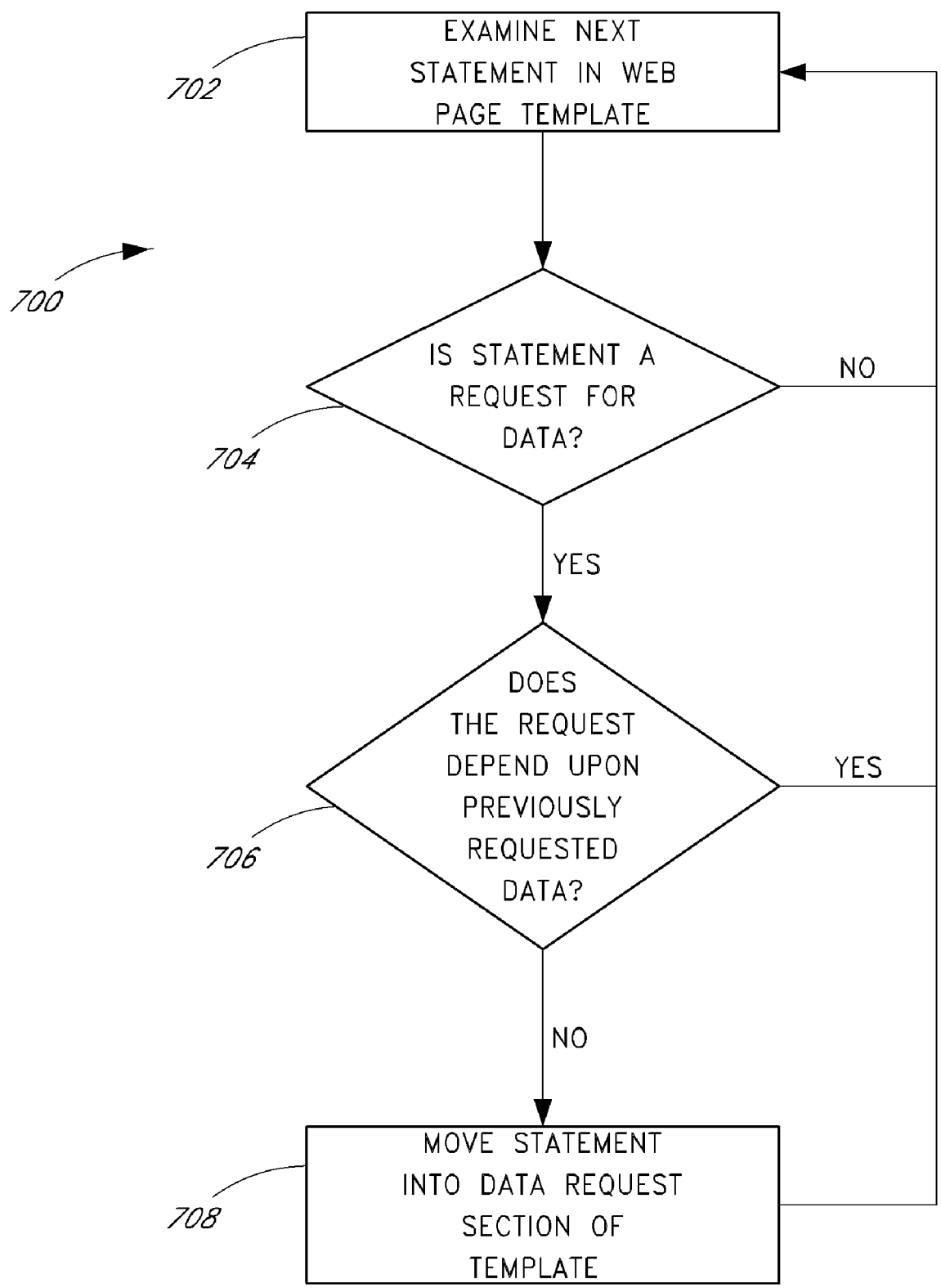
FIG. 7 illustrates a method in accordance with one embodiment for percolating data-requesting code up to a data request section of a web page template.

FIG. 7 illustrates a method 700 in accordance with one embodiment for percolating data-requesting code 620 up to a data request section 314 of a web page template 310. The method 700 begins at a step 702 by examining the first code statement of the web page template. At a step 704, if the statement is a request for data, control flows to a step 706. If, however, the statement is not a request for data, control flows back to the step 702, where the next statement is examined. At the step 706, if the request depends upon previously requested data, the statement is not moved and control flows back to the step 702, where the next statement is examined. If, however, at the step 706, the statement does not depend upon previously requested data, the statement is moved into the data request section of the template in a step 708, and control flows back to the step 702.

C. Handling of Dependent Data Requests

In certain cases, the formulation of a request for data from one service can depend upon the data provided by another service. For example, suppose a dynamically generated web page is generated in response to a user's request for products that match a particular search query term." A first service can be configured to provide a list of product identifiers, such as UPC codes, identifying available items. A second service can be configured to create web page components that display descriptions and images of the matching items. In this case, the first service must provide the product identifiers before the request for the corresponding web page components is sent to the second service.

When multiple sets of dependent requests are included in a linear control flow, the order in which the dependent requests are made can impose unnecessary delays and inhibit parallelism. The following linear code section shows one such example:

```
request data A1;
request data B1;
...
wait for data A1;
...
request data A2; /*request A2 depends on data A1*/
wait for data B1;
...
request data B2; /*request B2 is depends on data B1*/
```

In this code section, the request B2 cannot be made until after the arrival of the data A1. If the data B1 arrives before the data A1, the request of the data B2 is unnecessarily delayed.

In accordance with one embodiment, combinations of data requests where one request depends upon the results of another request (dependent data requests) are handled by a service request class wholly within the event-driven thread. In this manner, data returned in response to a first request generates an event within the event-driven thread and the event-driven thread can then immediately send the dependent request for data. The event-driven thread then packages up the data from the multiple dependent data requests and provides it to the linear thread. In this manner, data requests that depend upon other data requests can be removed from the web page template. Preferably, by removing dependent requests for data from the template, all of the data requests initiated by the template can be made independent of each other.

Figure 8:
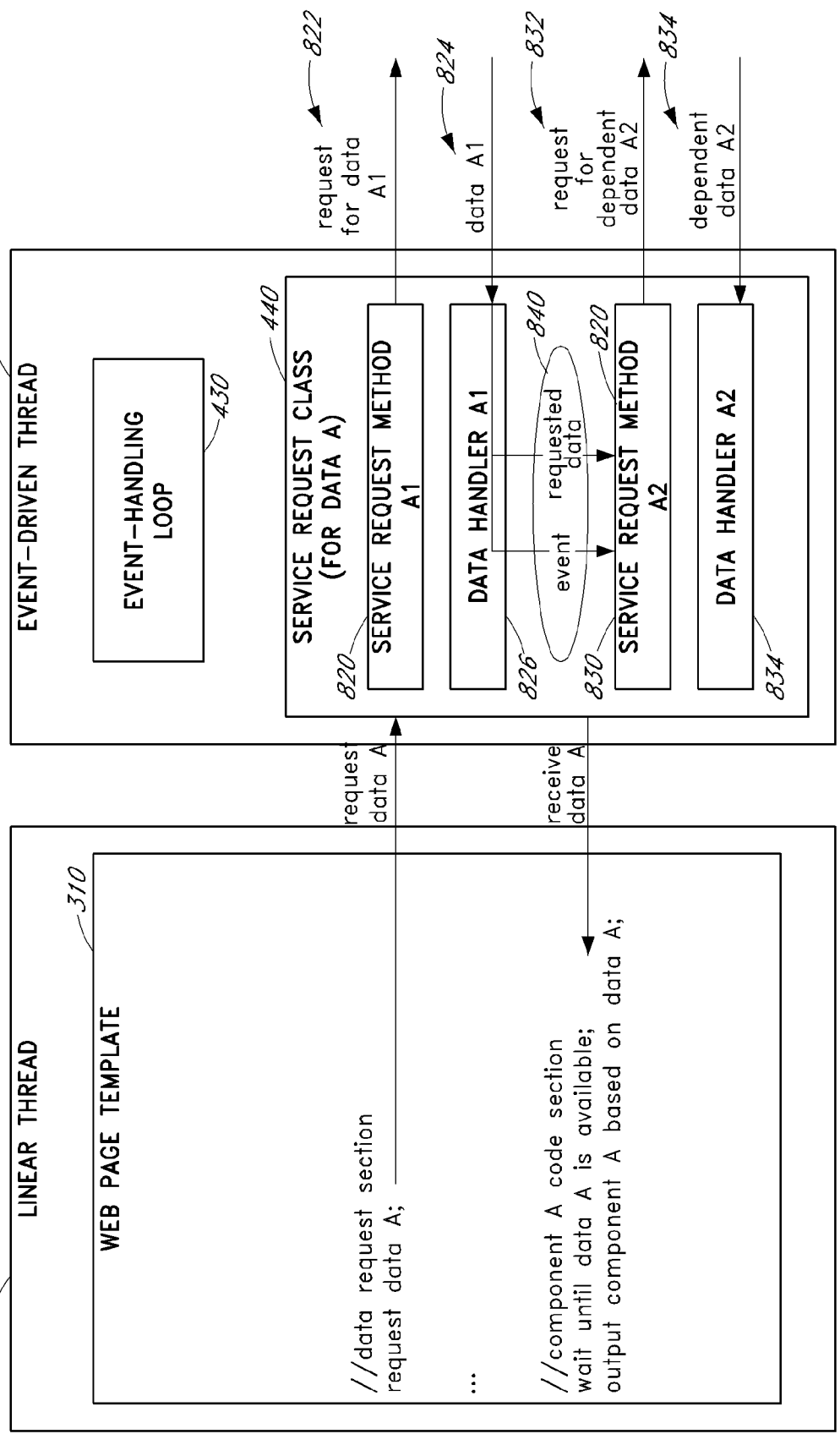
FIG. 8 illustrates one example of how dependent requests can be handled within the event-driven thread.

FIG. 8 illustrates one example of how dependent requests can be handled within the event-driven thread 420. The linear thread 410 initiates what looks like an independent data request for data A from the event-driven thread 420. Although the request for data A looks like an independent data request to the linear thread, in reality, the data A is based upon two separate sets of data, A1 and A2, which must be obtained from different services where the request for the data A2 requires the results of the data A1.

In response to the request for data A from the linear thread 410, the event-driven thread 420 initiates a service request method A1 820, which publishes a request for the data A1 822. The event-driven thread then returns to the event-handling loop 430. When a service provides the requested data A1 824, an event is triggered which causes the event-driven thread to initiate a data handler A1 826.

The data handler A1 826 preferably uses an internal pub/sub message 840 within the event-driven thread to indicate that the data A1 is available. The internal pub/sub message 840 triggers another event that initiates the service request method A2 830. Since the data A1 is now available, the service request method A2 830 can publish a request for the dependent data A2 832, which depends upon the data A1. When a service provides the requested dependent data A2 834, an event is triggered which causes the event-driven thread to initiate a data handler A2 836. The data handler A2, in turn, can be configured to provide the data to the linear thread 410.

By using an internal pub/sub message 840 to indicate that certain data is available, the data handler 826 for the received data A1 need not know which other service request methods require the received data. Accordingly, additional service request methods can be subsequently added and configured to use the requested data without modifying the data handler for the requested data. In alternative embodiments, however, the data handler A1 826 can be configured to call the service request method A2 830 directly without the need of an internal pub/sub communication.

In accordance with this embodiment, sets of dependent data requests are handled within the event-driven thread 420 rather than within the linear thread 410 in order to reduce or eliminate delays and to increase parallelism. The results of the multiple data requests in the set are then provided to the linear thread in response to a single, independent data request from the linear thread to the event-driven thread. In this manner, dependent requests for data can be avoided in the linear thread by issuing dependent requests from the event-driven thread.

IX. Service Architecture

Figure 9:
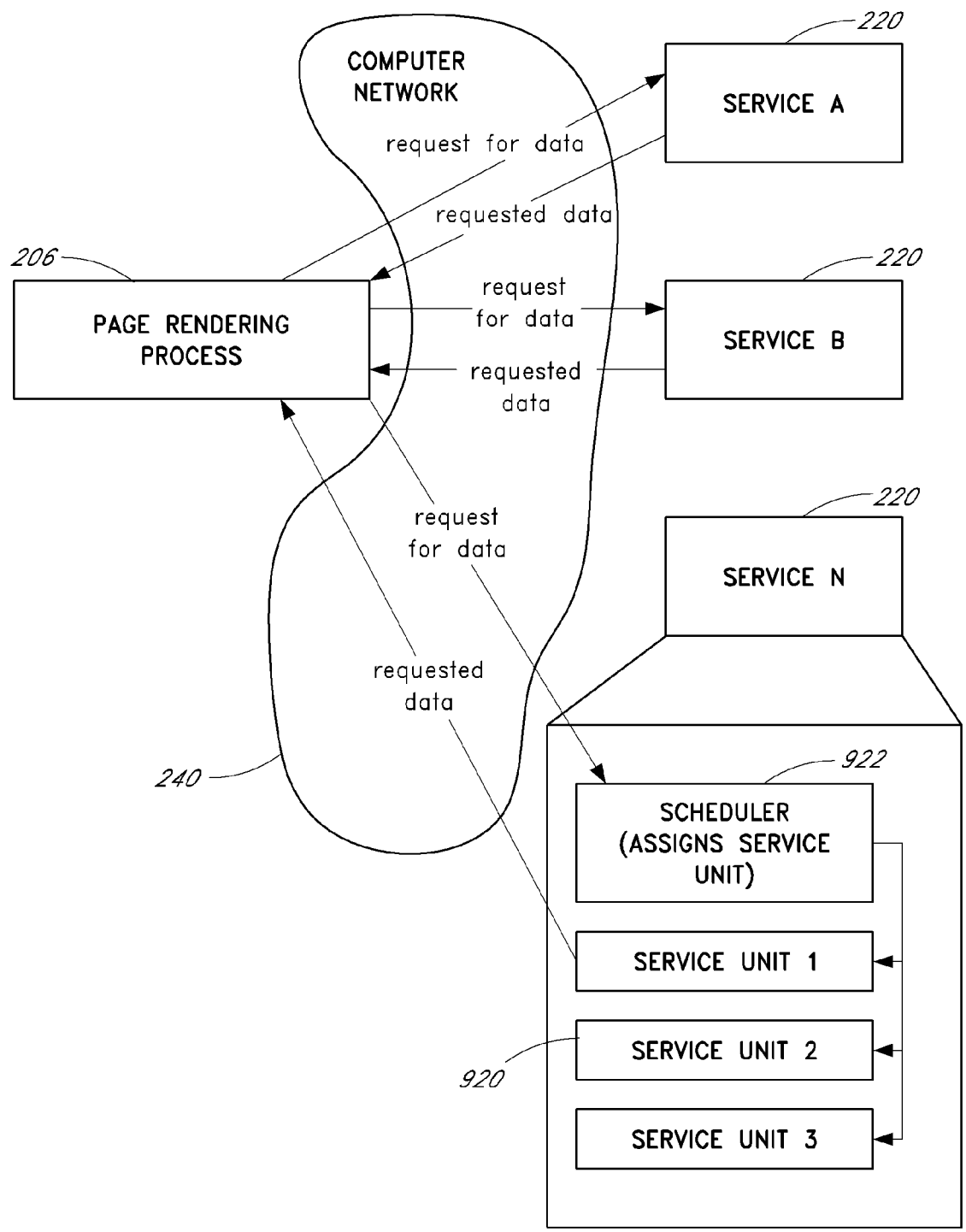
FIG. 9 illustrates how a service can be embodied as a set of service units.

As illustrated in FIG. 9, a service 220 can be embodied as a set of service units 920 to which service requests are assigned by a scheduler 922. Each service unit 920 can be a separate computer, processor, system or resource configured to respond to assigned service requests. The scheduler 922 is preferably configured to implement load balancing among the service units 920.

Figure 10:
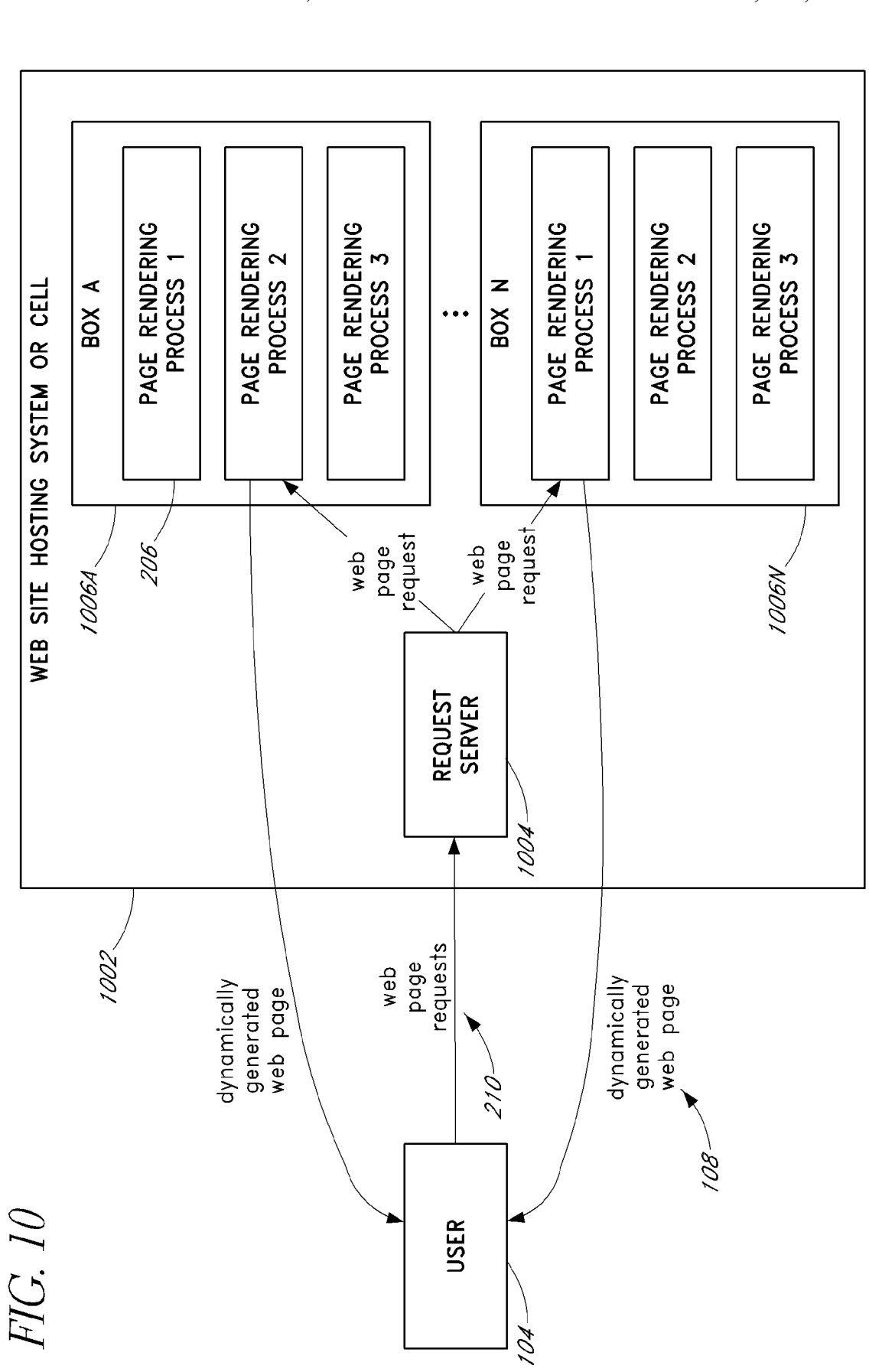
FIG. 10 illustrates a web site hosting system wherein multiple processors can each host multiple page rendering processes in accordance with one embodiment.

FIG. 10 illustrates a web site hosting system 1002 (or "cell") in accordance with one embodiment. The system 1002 is preferably configured to handle high volumes of incoming http requests from multiple users. In one embodiment, the system 1002 can be configured to handle http requests from a million or more simultaneous users 104. In order to handle high numbers of users, the system 1002 preferably includes multiple boxes 906A-N. In one embodiment, each box 1006 is a separate computer such as a server, a workstation, or even a desktop personal computer, where each computer has one or more microprocessors. Alternatively, each box 1006 can be a processor or processing unit in a multiprocessor computer. The number of boxes 1006 is preferably in the range of twenty, but any number of boxes can be used.

In one embodiment, each box 1006 is preferably configured to host multiple page rendering processes 206. By instantiating multiple page rendering processes 206 on a box, the box can handle the generation of several web pages simultaneously. The page rendering processes 206 are preferably configured to execute persistently on each box, responding to request after request, without terminating, in order to avoid the additional overhead of process creation and termination upon each page request.

Incoming HTTP requests are preferably received by a request server 1004, which routes each request to one of the boxes 1006 or to a specific page rendering process 206 on a box 1006. The request server 1004 can be an additional processor or computer linked in communication with the boxes 1006. The box 1006 receiving the request from the request server dynamically generates a response web page 108, which is then returned to the requesting user 104.

The request server 1004 is preferably configured to balance loads among the multiple boxes 1006 by appropriately assigning incoming HTTP requests. Applicable load balancing techniques are known to those skilled in the art.

Referring to FIG. 10, in order to enable more effective load balancing, the system 202 is preferably configured to direct new requests to the box with the lowest load regardless of the processor that handled the previous request of the same user. As a result, requests for different web pages of a single user's browsing session may be routed to different boxes 1006. For example, a first request from a user can be routed to a box A, which returns a first web page to the user. A next request from the user can be routed to a box N, which returns a second web page to user. Subsequent web page requests from the same user can be generated by still other boxes during the same session.

In accordance with one embodiment, the dynamically generated web pages 108 are personalized based on information or data particular to the user requesting the web page (referred to herein as "user data"). The user data can include, for example, the sequence of pages previously visited by the user, a set of items purchased or selected by the user, or a name, e-mail address, or other identifier of the user. For security or other reasons, however, it may be impractical to maintain the user data in a web browser cookie.

Figure 11:
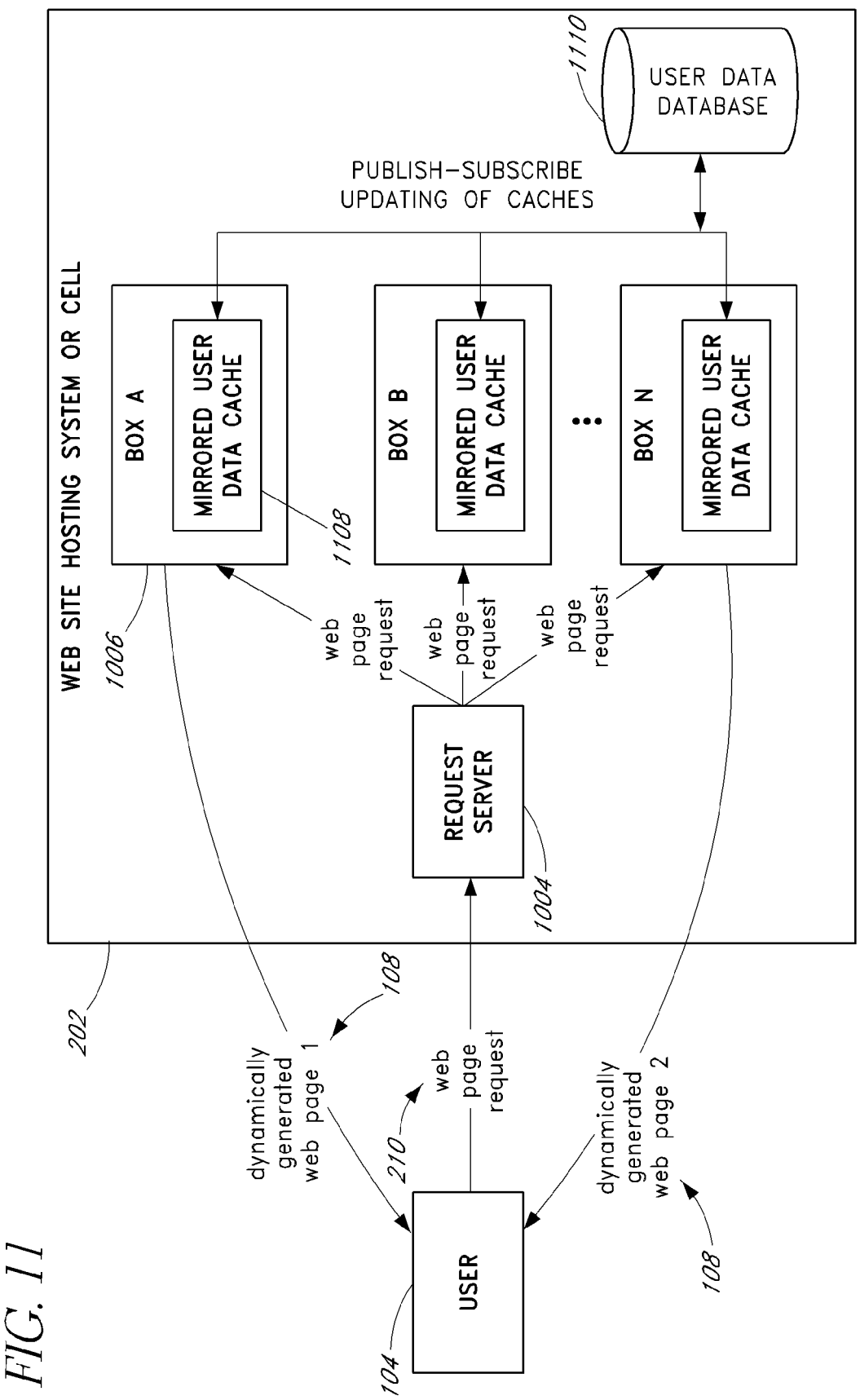
FIG. 11 illustrates how user data for users browsing a web site is maintained in a mirrored user data cache in accordance with one embodiment.

As illustrated in FIG. 11, user data for users 104 browsing the web site 102 are maintained in a mirrored user data cache 1108 in accordance with one embodiment. The user data cache 1108 is preferably mirrored on or for each of the boxes 1006 so that each box has fast access to the user data. As data is updated in the cache 1108 of any one box 1006, the updated data is propagated to the caches 1108 in the remaining boxes. In one embodiment, a pub/sub messaging system is used to maintain the updates. Alternatively, a broadcast system can be used to effect updates to the mirrored caches 1108. The user data can also be mirrored and/or stored in a user data database 1110 for longer term storage and/or when the data is flushed from the mirrored caches 1108 (in one embodiment, the data is periodically flushed based on a least-recently used algorithm). When a user begins a subsequent browsing session, the user's data can be loaded from the user data database 1110 back into the mirrored caches 1108.

X. Conclusion

As will be understood by one skilled in the art, the web site hosting system 202 described herein can be adapted to dynamically generate other types of documents, such as XML, HTML, SGML, postscript, Microsoft Word, or other documents.

In the preferred embodiment, the linear thread sends requests for data to the event-driven thread and the event-driven thread then requests the data from the services. In an alternative embodiment, nonblocking requests for data are transmitted directly by the linear thread to the services. The event-driven thread than handles the receipt of the requested data from the services and makes the data available to the linear thread.

Although the invention has been described in terms of certain embodiments, other embodiments that will be apparent to those of ordinary skill in the art, including embodiments which do not provide all of the features and advantages set forth herein, are also within the scope of this invention. Accordingly, the scope of the invention is defined by the claims that follow.

What is claimed is:

1. A computer system operable to dynamically generate documents in response to document requests received from user computing devices, the computer system comprising:
    one or more processors; and
    a document generation process executed by said one or more processors, said document generation process comprising a first thread and a second thread that interoperate with each other to dynamically generate requested documents, said first thread and second thread operable to remain persistent over multiple document requests, and operable to communicate with each other using a shared memory location of the computer system;
    wherein the first thread is responsive to a request for a document by using a document template to generate data requests such that multiple data requests are pending concurrently, and is operable to incorporate responses to said data requests into the requested document according to the document template, said first thread operable to enter into a blocked state when a response to a pending data request is needed to continue generating the requested document;
    wherein the second thread is responsive to said data requests generated by the first thread by generating service requests that are sent by the computer system on a network to corresponding services such that multiple service requests are processed in parallel by the services, and the second thread is capable of responding to receipt of a service request response by unblocking the first thread to enable the first thread to use requested data included in the service request response to continue generating the requested document;
    wherein the second thread is operable to combine at least a first service request that corresponds to a first service with a second service request that corresponds to a second service to generate a combined service request that is sent on a network to the first and second services, such that network traffic is reduced in comparison to network traffic associated with sending the first and second service requests separately, and wherein the computer system is programmed to send the combined service request on the network as a publish-subscribe message using a subject to which both the first service and the second service subscribe.

2. The computer system of claim 1, wherein the second thread is operable to aggregate multiple service requests corresponding to multiple data requests generated by the first thread into a single service request message for transmission on said network.

3. The computer system of claim 2, wherein the second thread is operable to use a timer to delay transmissions of service requests to enable service requests that are initiated at different points in time during generation of a requested document to be combined into said single service request message.

4. The computer system of claim 1, wherein the second thread is capable of generating a plurality of service requests in response to a single data request from the first thread, and is additionally capable of combining results of said plurality of service requests for delivery to the first thread.

5. The computer system of claim 4, wherein at least one of the plurality of service requests is dependent upon a result of another one of the plurality of service requests.

6. The computer system of claim 1, wherein the second thread is an event-driven thread that is invoked by the first thread by writing to the shared memory location and then generating an operating system trigger event.

7. The computer system of claim 1, wherein the second thread is responsive to the computer system receiving a document request while the first thread is in a blocked state by unblocking the first thread to enable the first thread to process the document request.

8. The computer system of claim 1, wherein the service requests include requests for dynamically generated content generated by corresponding services.

9. A computer-implemented method of dynamically generating a document in response to a document request, the method comprising:
    processing a document template with a first thread that runs on a computer system such that the first thread generates a plurality of data requests to request data for generating the document, said data requests generated such that multiple data requests are pending concurrently, wherein the first thread is operable to incorporate responses to said data requests into the requested document according to the document template, and to enter into a blocked state when a response to a pending data request is needed to continue generating the requested document;
    with a second thread that runs on the computer system, responding to said data requests generated by the first thread by generating service requests that are transmitted by the computer system on a network to corresponding services to fulfill said data requests, said service requests generated such that multiple service requests are processed in parallel by the services, wherein the first and second threads communicate with each other using a shared memory location of the computer system; and
    with the second thread, responding to receipt by the computer system of a service request response while the first thread is blocked by unblocking the first thread to enable the first thread to use data included in the service request response to continue generating the requested document;
    wherein the second thread, in generating said service requests, combines a first service request that corresponds to a first service with at least a second service request that corresponds to a second service to generate a combined service request that is sent to the first and second services, and the method further comprises transmitting the combined service request on a network as a publish-subscribe message having a subject to which both the first service and the second service subscribe.

10. The method of claim 9, further comprising, with the second thread, aggregating multiple service requests corresponding to multiple data requests into a single service request to reduce a number of service request transmissions.

11. The method of claim 10, wherein the second thread uses a timer to delay transmissions of service requests to enable service requests that are initiated at different points in time during generation of a requested document to be combined into said single service request.

12. The method of claim 9, further comprising, with said second thread, responding to a single data request from the first thread by generating a plurality of service requests, and by combining results of said plurality of service requests for delivery to the first thread.

13. The method of claim 12, wherein at least one of the plurality of service requests is dependent upon a result of another one of the plurality of service requests.

14. The method of claim 9, wherein the second thread is an event-driven thread that is invoked by the first thread by writing to the shared memory location and generating an operating system trigger event.

15. The method of claim 9, wherein the second thread further responds to the computer system receiving a document request while the first thread is in a blocked state by unblocking the first thread to enable the first thread to process the document request.

16. The method of claim 9, wherein the service requests include requests for dynamically generated content generated by corresponding services.

17. The method of claim 9, further comprising processing at least one subsequent document request with the first and second threads, such that the first and second threads remain persistent over multiple document requests.

18. A computer-implemented method of efficiently retrieving data for dynamically generating a requested document, the method comprising:
- receiving a first service request generated to request data for generating the requested document, said first service request directed to a first service accessible on a network;
- delaying transmission of the first service request on said network to wait for one or more additional service requests to be generated;
- while transmission of the first service request is delayed, receiving a second service request generated to request additional data for generating the requested document, said second service request directed to a second service that is separate from the first service;
- combining at least the first service request and the second service request into a combined service request message; and
- transmitting the combined service request message on the network for processing by services to which the combined service request corresponds, wherein the combined service request message is transmitted on the network as a publish-subscribe message using a subject to which both the first service and the second service subscribe;
- wherein the method reduces network traffic in comparison to a quantity of network traffic associated with sending the first and second service requests separately on the network.

19. The method of claim 18, wherein the step of delaying transmission of the first service request is performed based at least partly on collected timing data reflective of an amount of time the first service request takes to be serviced.

20. The method of claim 18, wherein the step of delaying transmission of the first service request is performed based at least party on a complexity factor associated with the first service request.

21. The method of claim 18, wherein the first and second service requests are generated by a first thread that runs on a computer system, and said steps of delaying and combining are performed by a second thread that runs on the computer system.

22. The method of claim 21, wherein the second thread combines the first and second service requests for transmission in response to the first thread entering a blocked state.

23. The method of claim 21, wherein the second thread is an event-driven thread that uses a timer to delay the transmission of the first service request.

24. A non-transitory computer-readable medium which stores executable program code that embodies the method of claim 18.

25. A computer system comprising one or more computing devices, said computer system programmed to perform a method that comprises:
- receiving a first service request generated to request data for generating the requested document, said first service request directed to a first service accessible on a network;
- delaying transmission of the first service request on said network to wait for one or more additional service requests to be generated;
- while transmission of the first service request is delayed, receiving a second service request generated to request additional data for generating the requested document, said second service request directed to a second service that is separate from the first service;
- combining at least the first service request and the second service request into a combined service request message; and
- transmitting the combined service request message on the network for processing by services to which the combined service request corresponds, wherein the combined service request message is transmitted on the network as a publish-subscribe message using a subject to which both the first service and the second service subscribe;
- wherein the method reduces network traffic in comparison to a quantity of network traffic associated with sending the first and second service requests separately on the network.

* * * * *